Patented May 1, 1928.

1,667,854

UNITED STATES PATENT OFFICE.

GERHARDT E. GRIMM, OF SPRINGFIELD, MASSACHUSETTS, ASSIGNOR TO WESTFIELD RIVER PAPER COMPANY, OF RUSSELL, MASSACHUSETTS, A CORPORATION OF MASSACHUSETTS.

RUBBER-SHEET MATERIAL FOR MANUFACTURING.

No Drawing. Application filed December 14, 1925. Serial No. 75,439.

This invention is an improvement in sheet rubber for manufacturing purposes, and more particularly in a backing for supporting the rubber.

Substantially all rubber used in sheet or strip form in manufacturing, as for instance in the making of tires for motor vehicles, and as patch material for such tires, is supplied in sheets or strips of suitable dimensions, each consisting of a relatively thick film of rubber upon a backing of flexible material.

The soft rubber is placed upon the backing, by means of rolls, which press the rubber to the backing, and insure a film of the required thickness. The rubber so applied is in a soft sticky condition, and adheres to the backing. In using the strips, as for instance in making a tire, the strip and backing is wound in place, the backing being stripped as the rubber film is wound. Heretofore the rubber film has been supported by a backing of closely woven canvas, known as Holland canvas and specially treated to receive the rubber.

The canvas is relatively expensive, and can be used but once, the backing being discarded when it is stripped from the rubber film. Furthermore the purported measurements of the canvas cannot be relied on, since it is more or less resilient, and will vary in width in accordance with climatic and temperature conditions. The variance from purported dimensions in 40 inch stock for instance may exceed or fall below the purported dimensions by as much as an inch.

The backing, which as before stated has heretofore been of cloth serves merely as a support for the rubber film prior to its utilization in the making of a sturcture or as a patch, and since the film is relatively weak and easily torn, it is obvious that the backing must be of a nature such that the rubber does not adhere too closely thereto. The connection between the film and the backing must permit the ready stripping of the film from the backing.

In order to provide the desired light adhesion between film and backing, the backing must have a surface of a nature such that it is solid, dry, and non-adhesive at normal temperatures, and at the temperature of the rubber when it is rolled thereon. Since when rolled the rubber film contacts with both faces of the backing, both faces must be so surfaced.

Since rubber deteriorates quickly with age, it is desirable that the film be held in a condition such that it will age with a minimum of deterioration. With this object in view, as much of the surface of the film as possible should be protected by a covering impervious to air, thus to retain the resiliency and the elasticity of the rubber unimpaired.

One of the primary objects of the present invention is the provision of sheet or strip of material of the character specified, composed of a film of rubber and a backing therefor whereon the film is perfectly supported against displacement in the normal handling thereof, but may be readily stripped from the backing when desired.

Another object is the provision as an article of manufacture, of a material suitable for use in manufacture, or as a patch material, in a form such that both faces of the film are covered and protected by an impervious air proof shield of flexible material.

Another object is the provision of an inexpensive backing of paper or the like, surfaced coated with a material of a nature such that it remains dry, solid, non-adhesive, and with a low co-efficient of friction in all temperature conditions to which it is subjected.

With these and other objects in view the invention consists in the mounted film of rubber as an article of manufacture, in the backing therefor, and in the method of preparing the backing and the patch material, it being understood that various changes in the proportions of ingredients and in the minor details of the process may be resorted to without departing from the spirit of the invention.

For the backing of the present invention, I make use of strong, high grade, long fiber paper, and I surface coat the paper with a solution which when dried thereon, provides a smooth, glistening, glazed surface, solid, dry and non-adhesive at all temperatures to which it is subjected while carrying the film.

The solution used has for its essential ingredients a soluble silicate or silicates, known as water glass, dextrin and glycerol or glycerine. Either the sodium or potassium silicate may be used or a mixture of the two.

The above ingredients are combined in about the following proportions: soluble silicate (potassium, sodium, or both), 25 lbs.; glycerol, 1 lb.; dextrin, 1 lb.; water, 1½ gal.

The solution or mixture prepared as above specified is applied to the paper in any suitable manner as for instance with brushes, or the paper may be run through the solution or mixture and the excess removed.

The backing so prepared is relatively inexpensive and forms an efficient support for the rubber, from which however the film easily may be stripped and without leaving any fragments on the backing. Both faces of the paper should be surfaced, so that when the article is formed into a roll, both faces of the film engage the prepared backing.

In the completed article the water glass provides the solid dry and non-adhesive facing or surface for the paper. The glycerol acts to soften the water glass, which otherwise would make the paper non-flexible, and liable to crack when bent. The dextrin acts as an adhesive.

I claim:

1. As an article of manufacture, a relatively thick film of soft rubber on a backing of paper surfaced with a smooth, uniform, even coating of a soluble silicate, an adhesive solid at normal temperatures, and glycerol.

2. As an article of manufacture, a relatively thick film of soft rubber on a backing of paper surfaced with a smooth, uniform, even coating of sodium silicate, dextrin and glycerol.

3. The process of preparing rubber sheet material, which consists in surfacing paper with a smooth, uniform, even coating of water glass, dextrin, and glycerol and placing a relatively thick film of hot soft rubber thereon.

4. The process of preparing rubber sheet material, which consists in surfacing paper with a smooth, uniform, even coating of water glass, dextrin, and glycerol in substantially the proportions of water glass 25 lbs. dextrin and glycerol 1 lb. each, and placing a relatively thick film of hot soft rubber thereon.

5. The process of preparing rubber sheet material which consists in flowing a film of soft rubber upon a backing of paper surfaced with a smooth, uniform, even coating solid at normal temperatures, and composed of soluble silicates, dextrin and glycerol.

Signed at New York in the county of New York and State of N. Y., this 10th day of December A. D. 1925.

GERHARDT E. GRIMM.